(12) United States Patent
Yamamoto et al.

(10) Patent No.: US 7,189,174 B2
(45) Date of Patent: *Mar. 13, 2007

(54) CHAIN TENSIONER

(75) Inventors: Ken Yamamoto, Shizuoka (JP); Eiji Maeno, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/111,631

(22) PCT Filed: Dec. 10, 2001

(86) PCT No.: PCT/JP01/10786

§ 371 (c)(1),
(2), (4) Date: Dec. 10, 2002

(87) PCT Pub. No.: WO03/050436

PCT Pub. Date: Jun. 19, 2003

(65) Prior Publication Data

US 2003/0139235 A1    Jul. 24, 2003

(51) Int. Cl.
*F16H 7/08* (2006.01)

(52) U.S. Cl. ................................. 474/109

(58) Field of Classification Search .............. 474/109, 474/110, 111, 114, 102, 101
See application file for complete search history.

(56) References Cited

U.S. PATENT DOCUMENTS

| 3,525,366 | A | * | 8/1970 | Frees | 138/109 |
| 4,777,950 | A | * | 10/1988 | Kees, Jr. | 606/158 |
| 4,792,322 | A | * | 12/1988 | Goppelt et al. | 474/136 |
| 5,700,214 | A | | 12/1997 | Kuznets et al. | 474/110 |
| 5,704,860 | A | | 1/1998 | Stief | |
| 5,931,754 | A | * | 8/1999 | Stief et al. | 474/109 |
| 5,967,920 | A | | 10/1999 | Dembosky et al. | 474/109 |
| 6,120,402 | A | * | 9/2000 | Preston et al. | 474/109 |
| 6,234,928 | B1 | * | 5/2001 | Suzuki et al. | 474/109 |
| 6,383,103 | B1 | * | 5/2002 | Fujimoto et al. | 474/110 |
| 6,935,978 | B2 | * | 8/2005 | Hayakawa et al. | 474/109 |
| 2004/0266571 | A1 | * | 12/2004 | Izutsu et al. | 474/110 |

FOREIGN PATENT DOCUMENTS

| DE | 1 650 620 | | 1/1970 |
| DE | 3900190 | | 7/1990 |
| JP | 01126461 A | * | 5/1989 |
| JP | 3-100630 | | 10/1991 |
| JP | 9-512884 | | 12/1997 |
| JP | 11-210846 | | 8/1999 |
| JP | 2001-82558 | | 3/2001 |
| JP | 2001-146946 | | 5/2001 |
| JP | 2001-355691 | | 12/2001 |

* cited by examiner

*Primary Examiner*—Vicky A. Johnson

(57) ABSTRACT

This invention provides a chain tensioner that is compact, excellent in operation, easy to maintain and handle and low in manufacturing cost. This chain tensioner has a tubular housing 1 having a bottom, a plunger 3 installed in the inner periphery 1*a* of the housing so as to smoothly slide inside the housing, a return spring 5 providing the plunger 3 with a force pushing outward, a plurality of latching grooves 33*a*–33*d* formed on the outer periphery of the plunger 3, a resister ring 7 capable of locking in the latching grooves, and a check valve 6 that is mounted on the bottom of the housing inner periphery 1*a*, provides the housing inner periphery 1*a* with operating oil and prevents its reverse flow. The range of backward movement of the plunger 3 is limited by mating the resister ring 7 locked in the latching grooves 33*a*–33*d* with a first stopper 21 formed on the housing inner periphery 1*a*.

16 Claims, 7 Drawing Sheets

| Taper angles θ (°) | 6 | 8 | 10 | 15 | 20 | 22 |
|---|---|---|---|---|---|---|
| Plastic workability | × | △ | ○ | ○ | ○ | ○ |
| Stroke length | × | △ | ○ | ○ | ○ | ◎ |
| Sliding resistance (durability of registerring) | ○ | ○ | ○ | ○ | △ | × |

| Surface roughness (unit:S) | 1.6 | 3.2 | 6.3 | 12.5 |
|---|---|---|---|---|
| Extrusion force | ◯ | ◯ | ◯ | × |
| Abrasion performance | ◯ | ◯ | △ | × |
| Change in physical property | ◯ | ◯ | △ | × |

CHAIN TENSIONER

TECHNICAL FIELD

The present invention relates to a chain tensioner that keeps the tension of chains, for example, a chain for driving a camshaft, constant.

BACKGROUND ART

In general, chain drive systems, for example, a chain drive system that transmits rotation force of a crankshaft to a camshaft in a engine of a car, has a chain tensioner provided on its slack side to keep the chain tension constant.

As a conventional chain tensioner, such a mechanism is known that has a spring and a plunger incorporated in a housing and the spring provides the plunger with a repulsive force toward the outside of the housing. In the chain tensioner of this type, the plunger pushed by the spring provides the chain with tension by pushing the chain, while the chain tension is kept constant by balancing the pushing force given by the chain to the plunger with a hydraulic pressure in a hydraulic damper chamber formed behind the plunger.

In this chain tensioner, when the chain is held tense depending on the stopping posture during a standstill of the engine, the plunger pushed by the chain may sink considerably deep. If the engine is restarted at this moment, the chain shows a sudden relaxation and the plunger projects with a large stroke toward the outside. Then the hydraulic pump that applies hydraulic pressure to the hydraulic damper chamber only discharges a small amount of oil because it is in a state immediately after activation. Such an insufficient oil supply to the hydraulic damper chamber may cause air intrusion into the hydraulic damper chamber and result in unusual noises, degrading the damping performance.

In order to solve these problems, there have been presented several chain tensioners that limit the backward movement of the plunger, for example, in Japanese Patent Publication No. Hei. 3-10819, Japanese National Publication No. Hei. 9-512884, and U.S. Pat. No. 5,931,754.

However, the invention disclosed in the Japanese Patent Publication No. Hei. 3-10819 has following drawbacks.

① This invention has a latching groove formed on the inner peripheral surface of the casing and restricts the backward movement of the absorbing piston by mating a stopper ring locked in this latching groove with the outer peripheral surface of the absorbing piston. However, since the latching groove is formed on the inner peripheral surface of the cylindrical casing, it is difficult to machine the latching groove with high accuracy and the manufacturing cost becomes high.

② The whole unit size in the axial direction becomes large because a spring member is placed behind the absorbing piston, followed by a check valve, and the absorbing piston has a filled structure.

③ The stopper ring cannot be reached directly from the outside thereof and it is radially expanded only by the movement of the absorbing piston in the axial direction. Therefore, a complex and high precision groove machining is required for the piston and the casing so that the absorbing piston is not locked by the stopper ring when the absorbing piston is inserted in the casing during assembly.

④ Dedicated mechanism and tools such as a groove and an assembly ring are required to maintain the post-assembly initial set state (the state where the piston is pushed deepest in the casing: see FIG. 2 in the present patent publication). Thus the number of necessary components and process steps are increased.

⑤ It is difficult to separate the piston from the casing because the resister ring cannot be manipulated from the outside. Thus maintainability or the like becomes poor.

The invention disclosed in the Japanese National Publication No. Hei. 9-512884 is based on a technological concept similar to that disclosed in the above Japanese Patent Publication No. Hei. 3-10819, thus having similar problems. This invention aims at solving the above problem ④ by realizing the initial set state with a single ring member. However, this improvement results in a more complex groove structure.

On the other hand, in the U.S. Pat. No. 5,931,754, the latching grooves in which a clip is locked are formed on the outer peripheral surface of the piston. This structure, however, needs a large installation space in the axial direction, because the latching grooves are located remote from the spring in the axial direction and the piston is not made hollow. In addition, this invention employs a two-arm U-shaped clip instead of the ring member as the member for limiting the backward movement of the piston. This clip cannot be loaded inside the housing before the piston is inserted in the housing during assembly and thus it must be inserted in between the inner periphery of the housing and the outer periphery of the piston after the piston has been inserted. Then the inner diameter of the housing opening must be made larger than the outer diameter of the clip. In this case, another ring member (second stop ring) must be installed in the housing opening to prevent the coming-off of the clip. As a result, the number of necessary components becomes large. Also the number of components and process steps grow because dedicated members (such as a stopper pin) and grooves become necessary to maintain the post-assembly initial set state.

It is, therefore, an object of the present invention to provide a chain tensioner which is compact, easy to operate, maintain and handle and low in manufacturing cost, solving the above problems posed in the prior art.

In both inventions of Japanese Patent Publication No. Hei. 3-10819, and Japanese National Publication No. Hei. 9-512884, the latching groove is formed on the inner peripheral surface of the casing and the backward movement of the absorbing piston is restricted by mating the stopper ring locked in this latching groove with the outer peripheral surface of the absorbing piston.

In the chain tensioner of this type, the resister ring slides back and forth on the surface of the latching groove as the plunger reciprocates while the engine is running. The surface of the latching groove must be finished with high accuracy in order to lower the sliding resistance and abrasion. Conventionally, the surface is finished by grinding in general.

However, since the latching groove is formed on the inner peripheral surface of the casing, there is no choice but to conduct this finishing by so-called plunge grinding (the grindstone is pushed on the surface in the radial direction with no movement along the axial direction). Thus it is very difficult to grind the latching groove with high precision at low cost.

In the chain tensioner of this type, the stopper ring slides back and forth on the surface of the latching groove as the plunger reciprocates while the engine is running. If the sliding resistance grows, the plunger cannot smoothly move back or forth and then the response, stability and reliability of the chain tensioner degrade, affecting the durability of the stopper ring.

It is, therefore, a further object of this invention to form the above latching groove with high precision and at low cost as well as to provide a chain tensioner that shows good performance in response, stability and durability by reducing the sliding resistance between the plunger and the stopper ring during the back-and-forth movement of the plunger.

DISCLOSURE OF THE INVENTION

To attain the above objects, the chain tensioner according to the present invention includes a tubular housing having a bottom, a plunger installed in the housing so as to smoothly slide therein and having a hollow portion, a return spring inserted in the hollow portion of the plunger and providing the plunger with a force pushing outward, a plurality of latching grooves formed on an outer periphery of the plunger including an outer periphery of the hollow portion, a resister ring capable of locking in the latching grooves, and a first stopper formed on an inner periphery of the housing and limiting backward movement of the plunger by mating the resister ring locked in the latching groove therewith.

The chain tensioner according to this invention has a hollow plunger that moves back and forth in response to the loose and tense states of the belt and has a spring inserted in the hollow portion. Then the dimension of the entire unit in the axial direction can be shortened as much as the insertion of the spring and thus the system becomes more compact than the conventional one in the axial direction. Also a plurality of latching grooves are formed on the outer periphery of the plunger including the outer periphery of the hollow portion and the area bearing the latching grooves axially overlaps the area where a return spring is installed. Thus the dimension of the chain tensioner in the axial direction can be more compact than the conventional one where those areas are separately formed in the axial direction away from each other. It is preferable to form all the plurality of latching grooves on the outer periphery of the hollow portion in order to pursue compactness; however, a satisfactory effect can be obtained if at least one latching groove is formed on the outer periphery of the hollow portion.

Further, the chain tensioner according to the present invention includes a tubular housing having a bottom, a plunger installed in an inner periphery of the housing so as to smoothly slide therein, a return spring providing the plunger with a force pushing outward, a resister ring installed between an inner periphery of the housing and the outer periphery of the plunger, and a latching groove and a first stopper each capable of mating with the resister ring and limiting backward movement of the plunger by mating the latching groove with the first stopper via the resister ring, wherein the latching groove is formed on the outer periphery of the plunger and a surface of the latching groove is a surface formed by plastic working. When the latching groove is formed on the plunger, the first stopper is formed on the inner periphery of the housing.

Since the latching groove is formed on the outer periphery of the plunger, it becomes possible to finish the latching grooves by so-called plastic working that plastically deforms the material without removing, instead of grinding. Then the latching groove of precise surface roughness can be obtained at low cost.

The plastic worked surface can be realized by a surface molded by rolling, for example. Rolling can provide a surface roughness required for the latching grooves (for example, $Rmax \leq 6.3$, preferably $Rmax \leq 3.2$) at low cost, providing ensured excellent roughness more easily than common grinding.

In the present invention, the chain tensioner includes a tubular housing having a bottom, a plunger installed in an inner periphery of the housing so as to smoothly slide therein, a return spring providing the plunger with a force pushing outward, a resister ring installed between the inner periphery of the housing and an outer periphery of the plunger, and a latching groove and a first stopper each capable of mating with the resister ring and limiting backward movement of the plunger by mating the latching groove with the first stopper via the resister ring, wherein the latching groove provided with a tapered face at its rear is formed on the outer periphery of the plunger and a taper angle of the tapered face against the plunger axial line is at least 8 degrees and no more than 20 degrees.

As the rear of the latching groove is tapered, the resister ring guided onto the tapered face can radially expand smoothly, the plunger moves back and forth smoothly and the response and operational stability of the chain tensioner are enhanced. If the taper angle of this tapered face is smaller than 8 degrees, working accuracy may become low during the working of the latching groove and the retraction stroke of the plunger may become large when the engine is standstill. Meanwhile, if the taper angle is larger than 20 degrees, the plunger may not reciprocate smoothly because sliding resistance increases. Those potential problems can be prevented if the taper angle falls within the range set above.

Still further in the present invention, the chain tensioner includes a tubular housing having a bottom, a plunger installed in an inner periphery of the housing so as to smoothly slide therein, a return spring providing the plunger with a force pushing outward, a resister ring installed between the inner periphery of the housing and an outer periphery of the plunger, and a latching groove and a first stopper each capable of mating with the resister ring and limiting backward movement of the plunger by mating the latching groove with the first stopper via the resister ring, wherein the latching groove is formed on the outer periphery of the plunger and the surface roughness, Rmax, of a sliding face of the plunger outer periphery on which the resister ring slides is no more than 6.3 μm.

When the surface roughness, Rmax, of the sliding face on which the resister ring slides is made 6.3 μm or less, preferably 3.2 μm or less, the sliding resistance becomes sufficiently small while the resister ring slides on the sliding face during the back-and-forth movement of the plunger. Then the response and stability of the chain tensioner are improved as the plunger moves back and forth smoothly. It is known that the abrasion rate grows in proportion to surface roughness. Therefore, there is a fear of damage to the resister ring due to abrasion if the surface roughness is large. However, as far as the surface roughness of the sliding face falls within the above range, the friction force becomes small sufficiently enough to prevent the abrasion of the resister ring and damage to the resister ring can be prevented for a long period.

The sliding face can be made by rolling. Rolling can provide a surface roughness of $Rmax \leq 3.2$, which level is very difficult to attain by grinding, even at low cost, and guarantee a precise surface roughness better than that attained by grinding.

The above sliding face can be formed in a form included in the latching groove, for example, while it can be formed separate from the latching groove.

For example, when including the sliding face in the latching groove, the tapered face serving as the sliding face may be formed on the latching groove at its rear. Then, since the resister ring guided on the tapered face smoothly radially expands and shrinks, the plunger moves back and forth smoothly and the response and stability of the chain tensioner are enhanced.

When a check valve for supplying an working fluid in a space between the housing bottom and the plunger and preventing its reverse flow is installed in the chain tensioner, a damper chamber is formed that holds the working fluid in the space and the plunger movement can be damped when it shuttles in response to the tense and loose states of the chain.

In every configuration of the above examples, if a ring portion and a manipulation portion for radially expanding the ring portion are installed in the resister ring, it becomes possible to expand the resister ring regardless of the movement of the plunger in the axial direction and to smoothly and easily switch the operational states (such as initial set, limitation to backward movement and prevention of disassembling) of the chain tensioner. In this case, if the manipulation portion is installed so that it can be manipulated through a notch cut in the housing from the outside of the housing, the operator can expand the resister ring manually (or using a tool) and the chain tensioner becomes further easier to handle.

In this case, a crossover is formed in the resister ring so that it becomes easy to radially expand the resister ring.

The notch is formed so that its bottom is not in contact with the resister ring when the resister ring locked in the latching groove is mated with the first stopper. Then the deformation of the resister ring can be prevented because the resister ring does not receive shocks provided by a clash between the housing and the plunger during the back-and-forth movement of the resister ring along with the reciprocating movement of the plunger.

If a second stopper which can be mated with the resister ring is installed before the first stopper on the inner periphery of the housing and it is mated with the resister ring, the jump-out of the plunger due to the force of the return spring can be prevented. If this second stopper is made in one piece together with the housing, the number of components can be reduced. Note that "before" in this case implies the direction the plunger projects from the housing.

The inner diameter of the second stopper of the housing can be made smaller than the outer diameter of the resister ring. Then the resister ring does not come off the housing, retained by the second stopper.

A set wall that is mated with the second stopper through the resister ring is formed on the outer periphery of the plunger before the foremost latching groove. Then the plunger can be held in the state (initial state) in which the plunger sinks deep in the housing and thus it becomes easy to handle during transportation. This initial set can be easily released by radially expanding the resister ring so that an inner diameter of the resister ring becomes larger than an outer diameter of the set wall.

A safety wall that is mated with the second stopper through the resister ring is formed on the outer periphery of the plunger after the rearmost latching groove. Then it is ensured that the plunger does not come off the housing when pushed by the return spring. In this case, the plunger can be removed from the housing by radially expanding the resister ring so that the outer diameter of the resister ring becomes larger than the outer diameter of the safe wall. Then it becomes easy to disassemble and maintain the chain tensioner. Note that "after" implies the direction the plunger retracts in the housing.

An air vent having leading to the hollow portion is formed in the plunger. Then the air mixed in the working fluid is quickly discharged to the outside and thus the resilient function of the working fluid can be maintained with stability.

Each latching groove is provided with a tapered face at its rear so that the resister ring guided onto the tapered face can expand smoothly. Thus the plunger moves back and forth smoothly with enhanced operational stability.

A cylindrical face is formed behind the tapered face of each latching groove and this cylindrical face fits onto the inner peripheral surface of the housing. Then vibration due to the back-and-forth movement of the plunger is damped and at the same time the leak of the working fluid flowing in the space between the inner peripheral surface of the housing and the outer peripheral surface of the plunger can be easily controlled.

BEST MODE FOR CARRYING OUT THE INVENTION

Now, preferred embodiments of the present invention will be described below based on FIGS. 1–12.

Figure 1A:
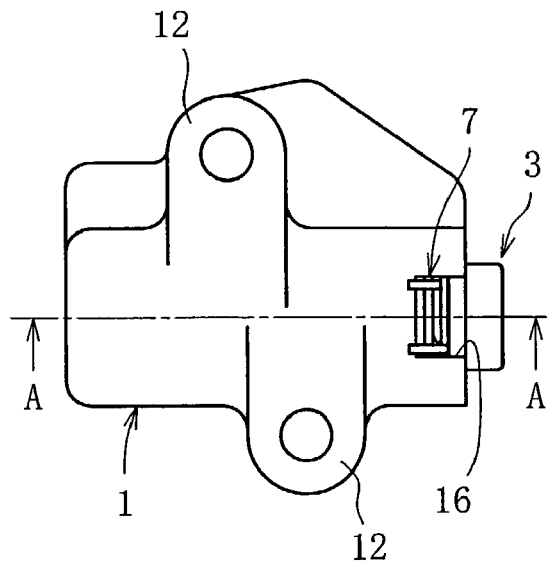
FIG. 1A is a plan view of a chain tensioner according to the present invention.
Figure 1B:
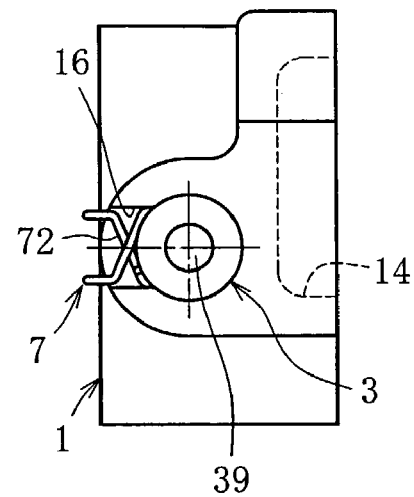
FIG. 1B is a side view thereof.
Figure 2:
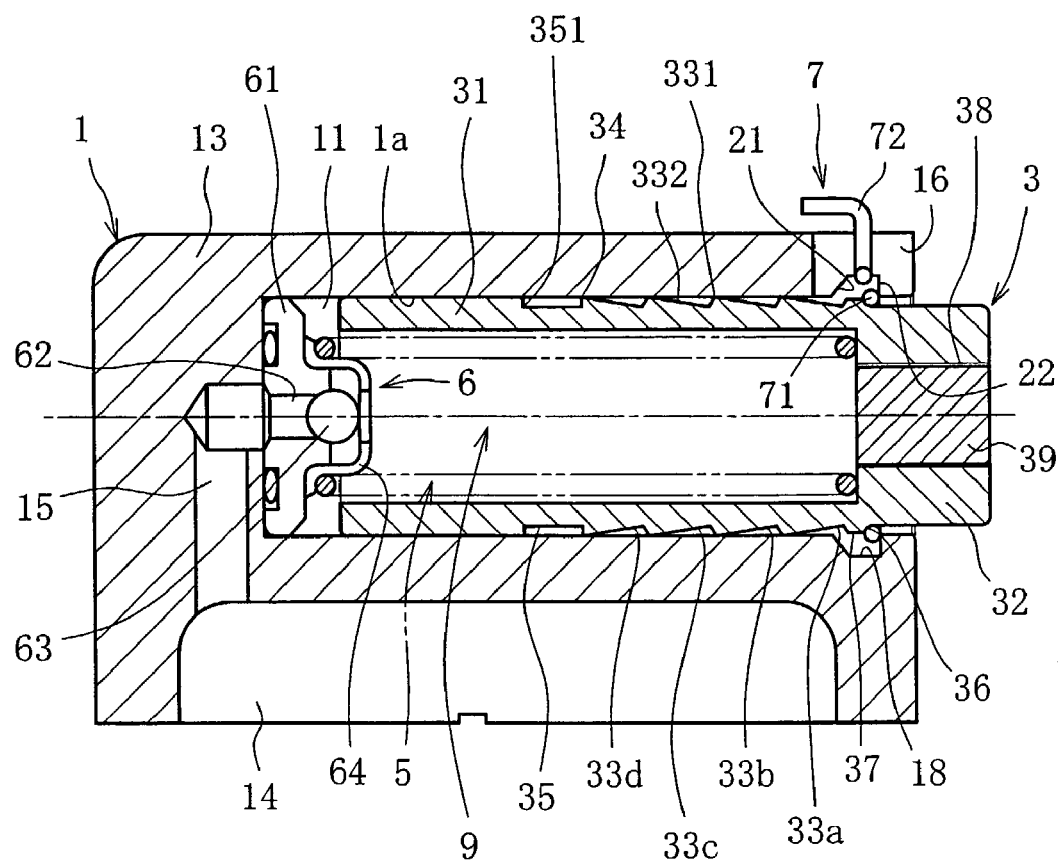
FIG. 2 is a sectional view taken along A—A line in FIG. 1A.

Referring now to FIG. 1 and FIG. 2, a chain tensioner according to the present invention is composed of the major components such as a housing 1, a plunger 3 installed in the inner periphery of the housing 1, a return spring 5, a check valve 6 and a resister ring 7 fit on the outer periphery of the plunger 3. Note that in the explanation that follows, the direction the plunger 3 projects is called "front" (right-hand side in FIG. 1A, FIG. 2, FIG. 3, FIGS. 7–9), while the direction the plunger 3 retracts is called "back" (left-hand side in the same figures).

A hollow cylinder unit 11 for incorporating the plunger 3 is formed in the tubular housing 1 that has a bottom. Mounting portions 12 for mounting on an engine block are formed on both sides of the cylinder unit 11 (see FIG. 1A). An oil supply passage 15 is formed in the bottom 13 of the housing 1 so as to guide operating oil serving as the working fluid from a tank 14 to the cylinder unit 11. A notch 16 is cut in the axial direction at the opening end of the inner peripheral surface 1a of the housing on a place along circumferential direction. Through this notch 16, a manipulation portion 72 of the resister ring 7 protrudes from the housing 1 outwardly. In the vicinity of the opening end of the inner peripheral surface 1a of the housing 1, an annular guide groove 18 is formed that runs almost center in the notch 16 along the axial direction. A first stopper 21 and a second stopper 22 each of which is mated the resister ring 7 are formed on the axially opposing walls at either end of the guide groove 18. The present embodiment shows an example where the wall including the first stopper 21 on the backside is tapered to expand toward the front side and the wall including the second stopper 21 on the front side is extended almost radially. The width of the guide groove 18 in the axial direction is larger than the wire diameter of the ring portion 71 of the resister ring 7. Therefore, the ring portion 71 of the resister ring 7 can move back side and front side in the guide groove 18.

The plunger 3 is a cylindrical tube having a bottom, and a cylindrical hollow, portion 31 is formed in its back. The return spring 5 is installed in the inner periphery of the hollow portion 31 under a compressive state. One of the ends of this return spring 5 is held in the bottom 32 of the plunger 3, while the other end is held in the bottom 13 of the housing 1. Thereby, the plunger 3 is always given an elastic force toward the front side to project from the housing. A hydraulic damper chamber 9 is formed in the space (including the inner space of the hollow portion 31) between the housing bottom 13 and the plunger 3, in other words, the part of the cylinder unit 11 behind the plunger 3 and the inner space of the hollow portion 31. This hydraulic damper chamber 9 is filled with operating oil supplied from the oil supply passage 15.

A plurality of annular latching grooves 33a–33d, axially spaced at equal intervals, are formed on the outer peripheral surface of the hollow portion 31 of the plunger 3. This embodiment shows an example in which four latching grooves 33a–33d are formed; they are called first latching groove 33a to fourth latching groove 33d from the front side.

Figure 3:
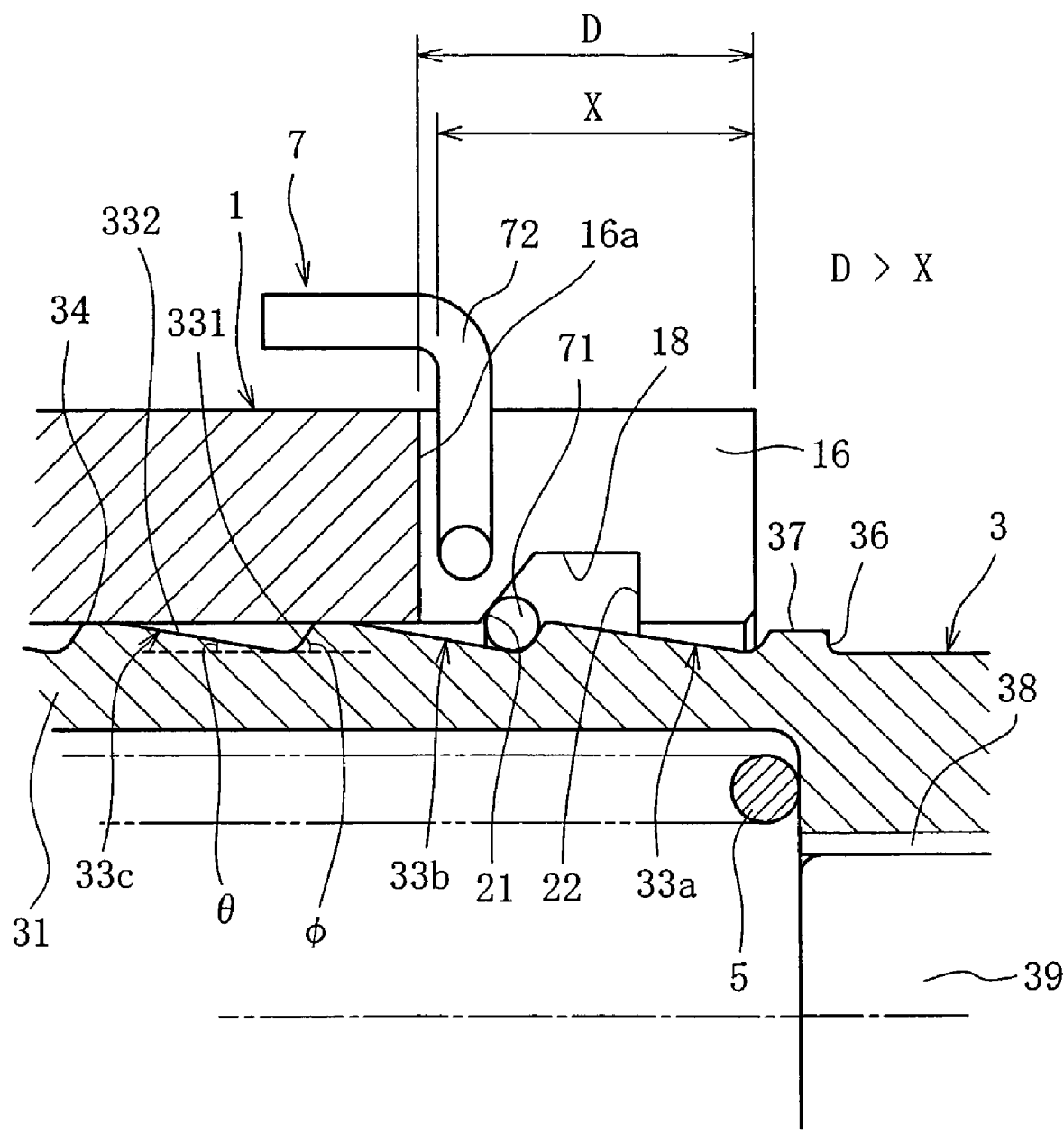
FIG. 3 is an enlarged sectional view of the chain tensioner of the above.

As enlarged in FIG. 3, in each of the latching grooves 33a–33d, the walls 331, 332 provided in both axial side of the bottom of the each grooves are tapered. The slope angle of the front wall 331 (lock wall) is larger than that of the back wall 332 (tapered face). The lock wall 331 and the tapered face 332 are continuous via a smooth curvature. The maximum groove depth of the latching grooves 33a–33d should be 30–50% of the wire diameter of the resister ring 7. If it is smaller than 30%, the resister ring 7 easily leaves the latching grooves 33a–33d, while if it exceeds 50% it becomes difficult to release the initial set state, which will be explained later. The tapered face 332 of each of the latching grooves 33a–33d is the sliding face on which the resister ring 7 slides, as described later.

A cylindrical face 34 is formed next to each tapered face 332 behind each of the latching grooves 33a–33d.

As described above, the return spring 5 is accommodated in the hollow portion 31 in the present invention. Thus the unit becomes compact as much as this space saving along the axial direction. In addition, a plurality of latching grooves 33a–33d are formed on the outer periphery of the hollow portion 31, and the area bearing these latching grooves 33a–33d axially overlaps the area where the return spring 5 is installed. Thus the length of the chain tensioner in the axial direction can be shorter than the conventional one where those areas are separately formed in the axial direction. This embodiment has shown an example in which all the latching grooves 33a–33d are formed on the outer peripheral surface of the hollow portion 31. However, it is acceptable that at least one part of the latching grooves is formed on the outer periphery of the hollow portion 31, and the other grooves may be formed on the area (for example, the outer peripheral surface of the bottom 32) other than the outer peripheral surface of the hollow portion 31 of the plunger. Even in such a case, the system becomes compact.

As shown in FIG. 2, an annular safety groove 35 is formed behind the fourth latching groove 33d, positioned at the rearmost position, of the latching grooves 33a–33d. The backward wall of this safety groove 35 is a safety wall 351 that can be mated with the resister ring 7. It is possible to prevent the plunger 3 from jumping out of the housing (prevention of disassembling) by mating the resister ring 7 that has been mated with this safety wall 351 with the second stopper 22 on the inner periphery 1a of the housing.

An annular set wall 36 is formed before the first latching groove 33a, located at the foremost position, of the latching grooves 33a–33d. As shown in FIG. 3, for example, this set wall 36 can be a forward wall of an annular protrusion 37 formed before the first latching groove 33a. The chain tensioner is maintained in its initial state (state shown in FIG. 2) by mating the resister ring 7 mated with the set wall 36 with the second stopper 22 on the inner peripheral surface 1a of the housing.

An air vent 38 is formed in the plunger 3 in order to exhaust air trapped in the hydraulic damper chamber 9 to the outside of the housing. This air vent 38 leads to the inner periphery of the hollow portion 31; for example, formed in the bottom 32 of the front end of the plunger 3. The air vent 38 shown in the figure is formed by cutting a female screw hole in the axial direction in the bottom 32 and pushing a shaft member 39 in this screw hole. In this case, since the air vent 38 becomes a spiral hole along the female screw, the whole length of this hole becomes considerably large, compared with its diameter. Thus it is possible to prevent the leak of operating oil and easily carry the trapped air to the outside of the housing. The structure of the air vent 38 described above is just an example and it may have another structure if a similar function is provided.

The check valve 6 is installed in the bottom of the housing 1, more specifically, next to the bottom 13 of the cylinder unit 11. This check valve 6 is composed of, for example, a valve seat 61, a valve 63 (for example, ball) that opens and closes a valve hole 62 formed in the valve seat 61, and a retainer 64 that controls the degree of open/close of the valve 63. The check valve 6 works so that it opens the valve hole 62 when the pressure on the side of the oil supply passage 15 becomes higher than that of the hydraulic damper chamber 9, in order to supply operating oil to the hydraulic damper chamber 9 through the oil supply passage 15, while it closes the valve hole 62, when the pressure of the hydraulic damper chamber 9 becomes higher than that of the oil supply passage 15, in order to prevent reverse flow of the operating oil in the hydraulic damper chamber 9 to the oil supply passage 15.

Figure 4A:
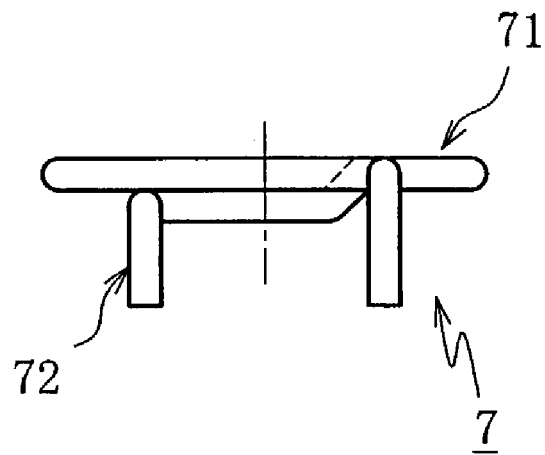
FIG. 4A is a plan view of a resister ring.
Figure 4B:
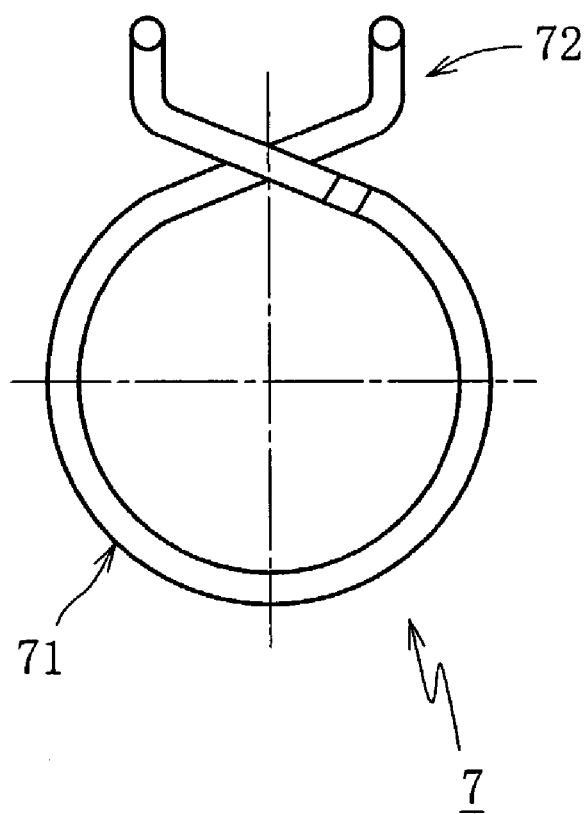
FIG. 4B is a front view thereof.
Figure 4C:
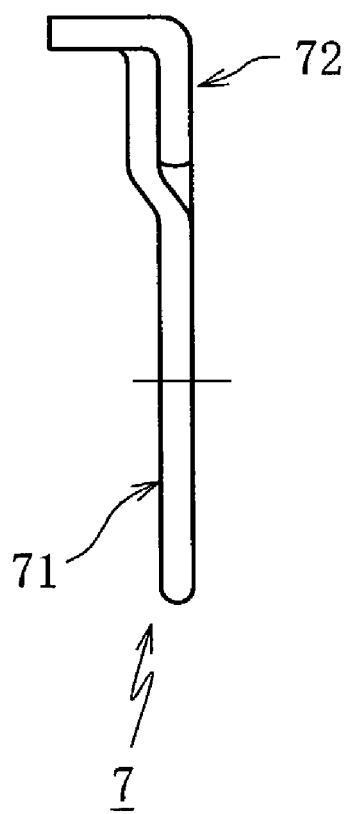
FIG. 4C is a side view thereof.

As illustrated in FIGS. 4A–4C, the resister ring 7 is composed of a ring portion 71 made of a fully closed ring and a manipulation portion 72 for radially expanding the ring portion 71. This embodiment shows an example of the resister ring 7 where the ring portion 71 is formed by winding a wire and the manipulation portion 72 is formed by crossing both ends of the wire. In this resister ring 7, the ring portion 71 can be radially expanded by shortening the distance in the circumference direction between it ends over the crossover. In this case, it becomes easier to expand the ring diameter if both wire ends of the manipulation portion 72 have kinks in the axial direction.

The resister ring 7 is formed so that in its natural state (with no expansion) the inner diameter of the ring portion 71 is smaller than the inner diameter of the opening end of the inner peripheral surface 1a of the housing (the inner diameter of the second stopper 22) and at the same time the outer diameter of the ring portion 71 is larger than the inner diameter of the opening end. Since the housing 1 has a notch 16, even the resister ring 7 having an outer diameter larger than the inner diameter of the housing inner periphery can be easily installed inside the housing 1 by tilting the resister ring 7 during its insertion (explained in detail later). Then the element (the second stopper 22 in this embodiment) for preventing the coming-off of the resister ring 7 can be made in one piece together with the housing 1. As a result, this mechanism can further reduce the number of necessary components and manufacturing steps, compared with the mechanism using a separate member for preventing the coming-off.

The chain tensioner described above is assembled in the following steps.

Figure 5:
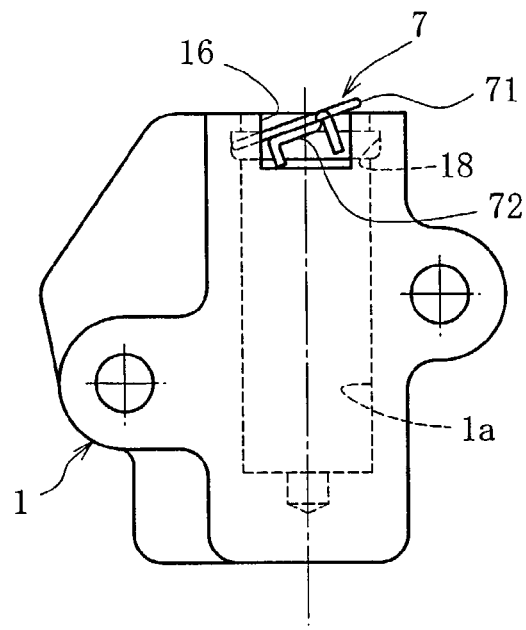
FIG. 5 is a plan view of a housing in the step of inserting the resister ring thereinto.
Figure 6A:
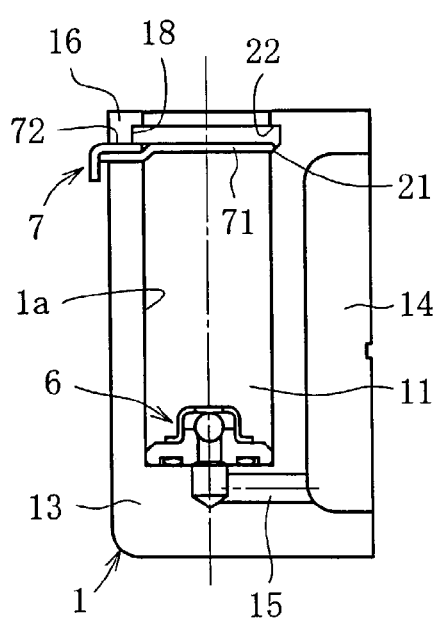
FIG. 6A is a sectional view illustrating the state before a plunger is inserted.

As shown in FIG. 6A, the resister ring 7 is installed after the check valve 6 has been mounted in the bottom of the cylinder unit 11 of the housing 1. To be more specific, first as shown in FIG. 5, the manipulation portion 72 is inserted in the notch 16 with the ring portion 71 being tilted against the axial line of the housing 1, and a part of the ring portion 71 is inserted in the guide groove 18. Next, the ring portion 71 is returned to the position parallel to the axial line of the housing 1, and then the whole part of the ring portion 71 is inserted in the guide groove 18.

Figure 6B:
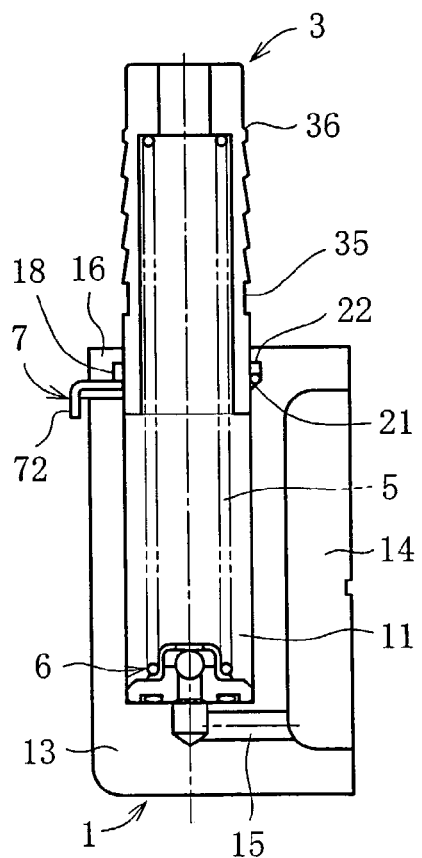
FIG. 6B is a sectional view illustrating the state after the plunger has been inserted.

After the resister ring 7 has been installed, the return spring 5 is inserted in the cylinder unit 11, as shown in FIG. 6B. The manipulation portion 72 protruding to the outside of the housing 1 is pinched (manually or with a tool) to radially expand the ring portion 71, and then the plunger 3 is inserted in the cylinder unit 11. The plunger 3 is pushed in against the elasticity of the return spring 5, the resister ring 7 is radially shrunk with resilience by releasing the manipulation portion 72 when the set wall 36 reaches behind the ring portion 71 of the resister ring 7, and the pushing force applied on the plunger 3 is released. Then the set wall 36 is mated with the ring portion 71 of the resister ring 7 and the ring portion 71 is mated with the second stopper 22 on the inner periphery of the housing to present the initial set state shown in FIG. 2. In this initial set state, the set wall 36, resister ring 7 and second stopper 22 fit each other to surely prevent the jump-out of the plunger 3 pushed by the elasticity of the return spring 5. Thus the chain tensioner can be transported with higher safety.

If the ring portion 71 of the resister ring 7 is expanded by pinching the manipulation portion 72 of the resister ring 7 after the chain tensioner in the initial set state has been mounted on the engine block, the lock between the set wall 36 and the resister ring 7 is released. As a result, the plunger 3 moves forward driven by the elasticity of the return spring 5 and pushes the chain via a chain guide (not shown). Then the chain becomes tense.

Figure 7:
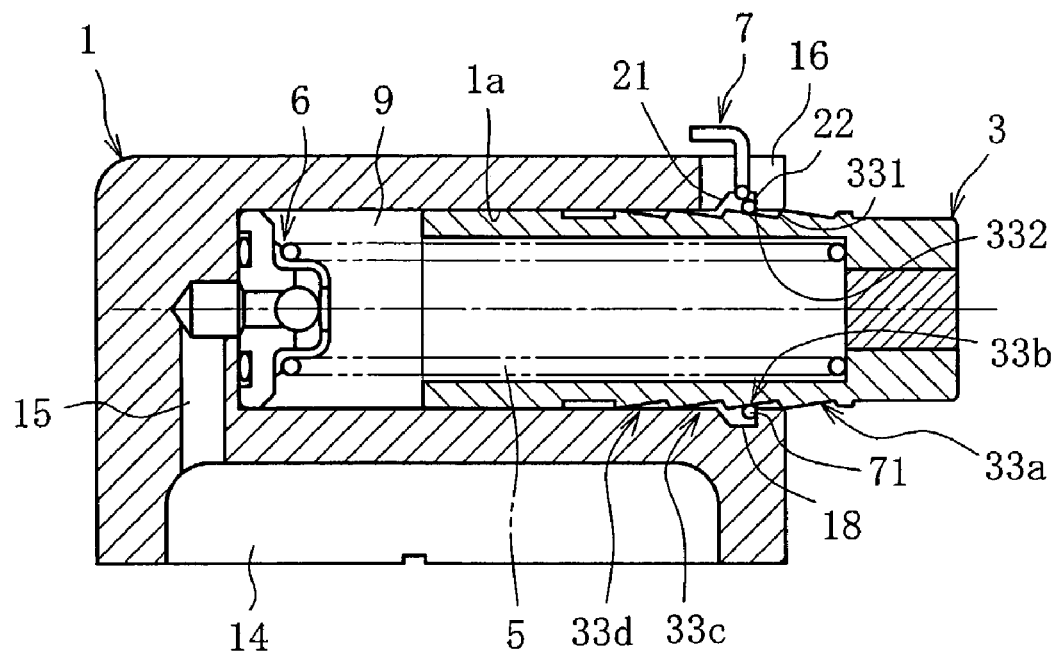
FIG. 7 is a sectional view illustrating the operating state of the chain tensioner.

As shown in FIG. 7 in this time, the ring portion 71 of the resister ring 7 is mated with one of the latching grooves 33a–33d (the second latching groove 33b in this figure), or stops on the cylindrical face 34 located behind each groove. Later, the chain gets tense during engine activation and pushes the plunger 3 backward. Then if this pushing force exceeds the sum of the elasticity of the return spring 5 and the hydraulic pressure supplied in the hydraulic damper chamber 9, the plunger 3 and the resister ring 7 move backward to the position where this sum of forces balances the pushing force. This retraction movement is performed slowly by the damping function of the operating oil filled in the hydraulic damper chamber 9. During the retraction of the plunger 3, the resister ring 7 shrinks in diameter, starting from the state of FIG. 7, sliding on the tapered face 332 serving as a sliding face, and moves back together with the plunger 3 while mating with the lock wall 331. As the plunger 3 retracts, the excessive operating oil inside the hydraulic damper chamber 9 leaks out of the housing through a micro-gap between the housing inner periphery 1a and the outer peripheral surface of the plunger 3.

Meanwhile, if the chain slacks, the plunger 3 moves forward driven by the forces provided by the return spring 5 and the hydraulic pressure of the supplied oil. As the plunger moves forward, the resister ring 7 as well moves forward along with the plunger 3. After the ring portion 71 fits in the stopper 22, the resister ring 7 expands in diameter sliding on the tapered face 332. If the chain has become longer than its initial length with time and the plunger 3 further moves forward, the ring portion 71 of the resister ring 7 is locked in a backward latching groove (third latching groove 33c in this figure), and it works in the same way as the case where the ring portion locks in the second latching groove 33b.

Figure 8:
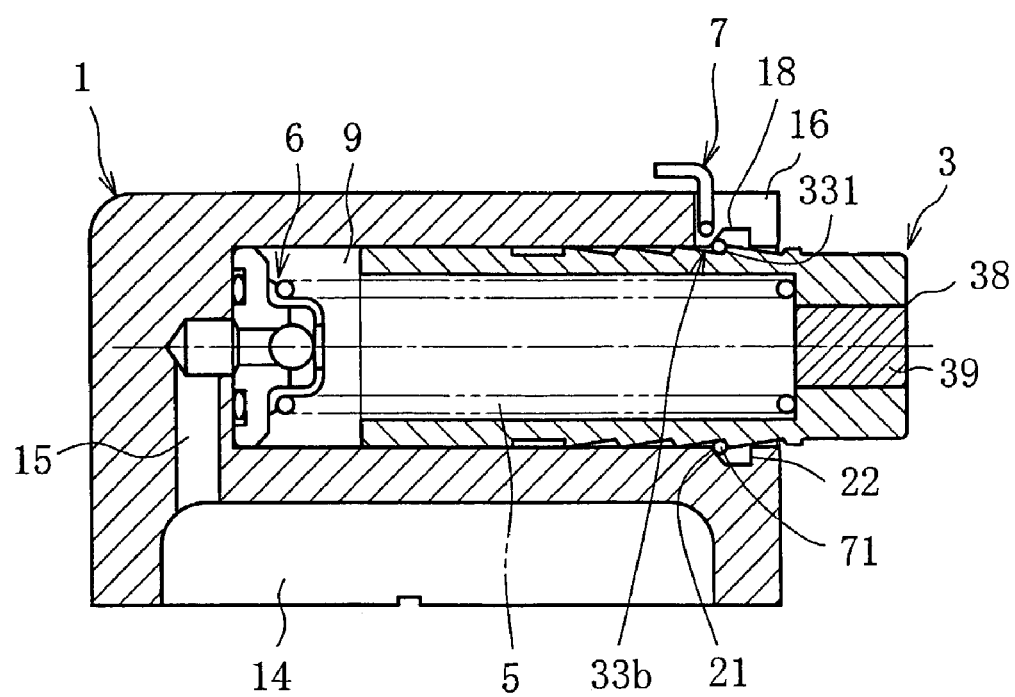
FIG. 8 is a sectional view illustrating the chain tensioner of which retraction has been limited.

When the engine is stopped, the plunger 3 may be push back depending on the position of the standstill cam. For example, the engine is stopped on an uphill, with the shift lever is stopped at the position of a front gear, or stopped on a downhill, with the shift lever is stopped at the position of a back gear, the chain gets tense and thus the plunger 3 is pushed back with a long stroke. Even in such a case, as shown in FIG. 8, since the outer diameter of the ring portion 71 of the resister ring 7 is smaller than the inner diameter of the first stopper 21, the resister ring 7 (the ring portion 71) that has been mated with the locking wall 331 of a latching groove (for example, the second latching groove 33b) is mated with the first stopper 21, and as a result, the plunger 3 is restricted not to retract any further (limitation to backward movement). In this case, the chain only slacks as much as the retraction stroke of the plunger 3. Thus the chain would not get excessively slack even when the engine is restarted. The chain would not slip off the sprocket and such problems like tooth skip and generation of unusual noises would be prevented.

Figures 9, 10:
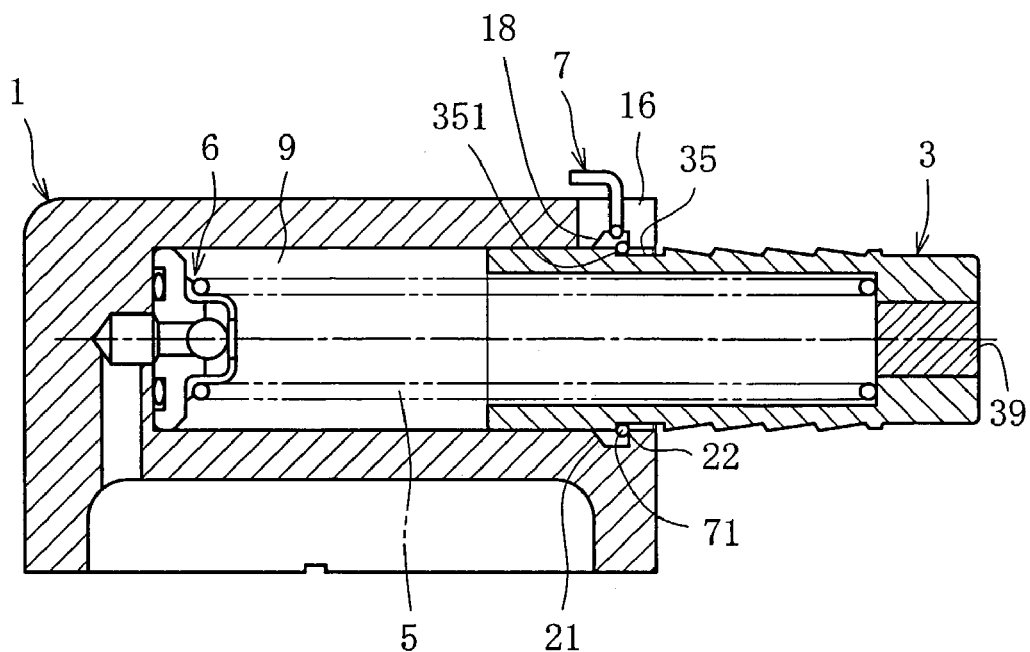
FIG. 9 is a sectional view illustrating the chain tensioner of which disassembling has been restricted.
FIG. 10 is a graph demonstrating experimental results (relationship between the taper angle and the plastic workability).

When the chain is removed for maintenance of the engine, for example, the elasticity of the return spring 5 pushes the plunger 3 to jump off the housing. However, even in such a case, as shown in FIG. 9, the ring portion 71 of the resister ring 7 locks in the safety groove 35 and the ring portion 71 mated with the safety wall 351 is mated with the second stopper 22 to prevent the coming-off of the plunger 3 (prevention of disassembling). Thus components such as the plunger 3 and the return spring 5 are controlled not to come off from the housing 1. When the plunger 3 is removed from the housing 1, it is easily carried out by pinching the manipulation portion 72 of the resister ring 7 to radially expand the ring portion 71 and unlock the engagement between the ring portion 71 and the safety wall 351.

As described above, the resister ring 7 moves back and forth along with the reciprocating movement of the plunger 3. When the manipulation portion 72 of the retracted resister ring 7 collides with the wall 16a (see FIG. 3) deep in the notch, the resister ring 7 may deform because of the collision. Thus there should be measures by which the manipulation portion 72 of the retracted resister ring 7 is not in contact with the wall 16a. This becomes possible, as shown in FIG. 3, by setting the axial length of the notch 16, D, at a value larger than distance X (the distance between the opening end of the housing 1 and the back end of the resister ring 7 inside the notch 16, at the moment the lock wall 331 of the latching groove has locked in the first stopper 21 via the resister ring 7), namely D>X.

In the chain tensioner according to the present invention, the initial set state, limitation to backward movement and prevention of disassembling can be realized by the use of only the resister ring 7. Thus, compared with the conventional chain tensioner using a plurality of ring members and clips for providing such functions, the chain tensioner according to the invention can significantly reduce the number of necessary components and manufacturing cost. In addition, since the structure of the plunger 3 has been simplified and the grooves are formed on the outer peripheral surface of the plunger 3 for easy machining, the machining cost can be lowered as well. Further, since the plunger 3 can be easily removed from the housing 1, maintenance is easy to perform.

These are the basic structure and functions of the chain tensioner according to the present invention. Then the detailed structure of this chain tensioner will be described below.

As mentioned above, when the resister ring 7 moves back and forth together with the plunger 3, the ring portion 71 may slide on the tapered face 332 (sliding face) of a latching groove. In this case, if taper angle θ of the tapered face 332 (the angle formed between the plunger axis and the tapered face 332: see FIG. 3) is too large, the elastic force applied by the resister ring 7 onto the plunger 3 grows and works as sliding resistance. Then the smooth back-and-forth movements of the plunger 3 (particularly forward movement) is impaired and thus the response of the chain tensioner may be lowered. An increase in sliding resistance also affects the durability of the resister ring 7. Increase in sliding resistance can be balanced by increasing the elasticity of the return spring 5; however, this method has limitations in terms of cost and design. Therefore, taper angle θ of the tapered face 332 should be minimized as much as possible so that the resister ring 7 can expand smoothly.

On the other hand, if taper angle θ is too small, such problems may be posed:

① working accuracy may degrade because a sufficient material thickness is not provided when forming the latching grooves 33a–33d by plastic working, for example, rolling;

② unusual noises occur upon engine restarting because the latching grooves 33a–33d are elongated in the axial direction and the plunger 3 retracts at a large stroke during engine stop.

In an experiment for finding the best range of taper angle θ for the tapered face 332, the results shown in FIG. 10 have been obtained. Plastic workability, backward stroke length and sliding resistance (durability of the resister ring) have been evaluated for the individual tapered faces of different taper angles (θ) in the experiment and marked either ⊚, ○, Δ, X (⊚ shows the best performance). The results shown in FIG. 10 indicate that taper angle θ should be at least 8 degrees and no more than 20 degrees, more preferably, at least 10 degrees and no more than 15 degrees.

The tilt angle, φ, of the lock wall 331 (see FIG. 3) should be an angle making itself close to parallel to the first stopper 21 so that the resister ring 7 can be firmly held in between the first stopper 21 and the lock wall. For example, this angle is set as, φ=60 degrees.

Figures 11, 12:
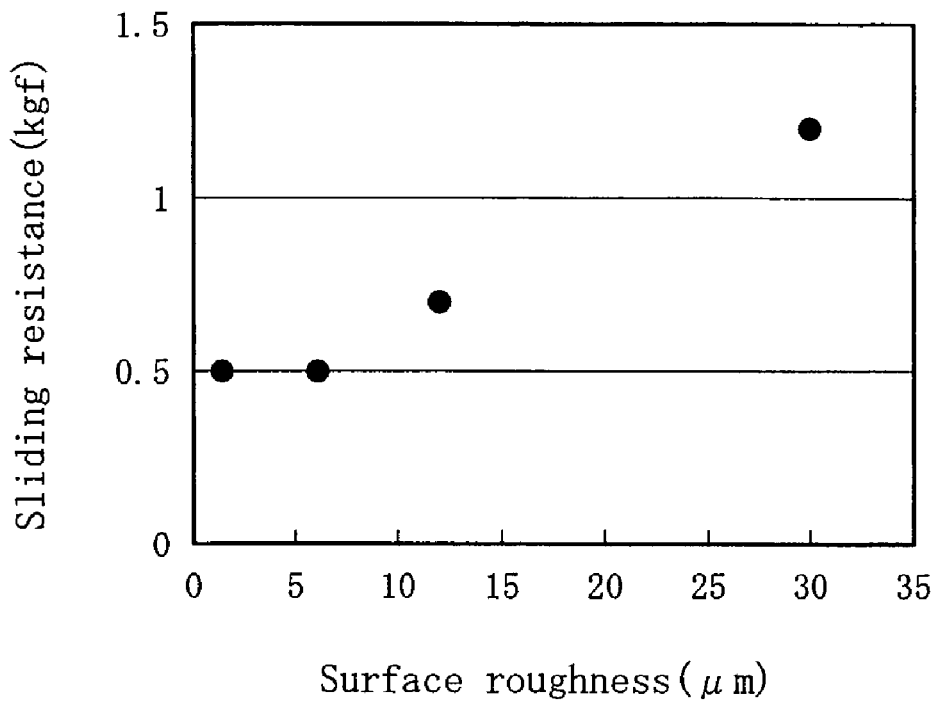
FIG. 11 is a graph demonstrating experimental results (relationship between the surface roughness and the sliding resistance).
FIG. 12 is a graph demonstrating experimental results (relationship between the surface roughness, projection force, abrasion property and performance change).

The surface roughness of the tapered face 332 can be a factor influencing the sliding resistance of the plunger 3. Thus the tapered face 332 should be as smooth as possible to lower sliding resistance. FIG. 11 shows results by preparing a number of metallic bars having the same diameter as that of the cylindrical face 34 of the plunger 3 and different levels of surface roughness from each other, fitting a resister ring thereon, and measuring the sliding resistance between the resister ring and the bar. The figure indicates that the higher the surface roughness, Rmax (JISB0601), becomes, the larger the sliding resistance becomes; and that it is possible to minimize sliding resistance if Rmax is 6.3 μm (6.3 S) or smaller.

FIG. 12 shows the extrusion force (sliding resistance) measured under the same conditions as those of FIG. 11, abrasion performance and change in the physical property, with symbols ○, Δ, X (○ indicates the best result). It is known that the rate of abrasion of the contacting materials increases in proportion to their surface roughness. "Abrasion performance" is taken into account because the resister ring may be damaged by abrasion depending on the level of surface roughness. The surface roughness of a sliding face changes from its initial magnitude with time as the surface is ground by abrasion; this means that the abrasion coefficient changes with time (the physical property changes with time). For example, the extrusion force is small if the initial surface is made smooth, while large if it is made coarse. When the surface roughness changes from an initial value, 12.5 s, to 3.2 s or smaller, the extrusion force becomes smaller than its initial magnitude, presenting changes in the physical property. It is not a preferable change. Therefore, the initial magnitude of surface roughness should be small in order to provide a sliding face of high stability during use and little changes with time in the "physical property" (changes in abrasion coefficient).

This figure indicates that if surface roughness Rmax is 3.2 μm [3.2(S)] or smaller in the tapered face 332, the "abrasion property" and "physical property change" as well as sliding resistance present excellent results.

It has thereby been found that surface roughness Rmax of the tapered face 332 should be 6.3 μm [6.3(S)] or smaller, more preferably, 3.2 μm [3.2(S)] or smaller.

The plunger 3 can be made by steel forging to provide the hollow portion 31. After forging, among the grooves (for example, latching grooves 33a–33d and safety groove 35) formed on the outer peripheral surface of the plunger 3, at least latching grooves 33a–33d are formed by plastic working, for example, rolling (the other grooves such as the safety groove 35 may be formed by the same method). As described above, while the engine is running, the resister ring 7 slides on the tapered face 332, and is mated with one of the latching grooves. Thus the surfaces of the latching grooves 33a–33d must be finished with high precision in order to reduce sliding resistance and sliding abrasion. In most of the conventional chain tensioners of which latching grooves are formed on the inner peripheral surface of the cylindrical housing, the latching grooves are finished by grinding. This grinding is often performed by plunge grinding since the inner peripheral surface must be machined. Because grinding of this type cannot be automated unlike the centerless grinding, the machining cost becomes high and there are limitations to the attained roughness provided by this machining.

In contrast, since the latching grooves 33a–33d are formed on the outer peripheral surface of the plunger 3 in the present invention, the grooves can be formed by rolling. Rolling makes it possible to easily provide surface roughness of Rmax≦3.2(μm), ensuring surface roughness better than the usual levels, Rmax=3.2–6.3. Moreover, since rolling process can be automated, groove forming can be performed at low cost with high precision.

A problem in the embodiment shown in FIG. 2 is that the hollow structure of a low rigidity is subject to rolling. However, if the depth of the latching grooves 33a–33d is controlled as mentioned above (the maximum depth of each latching groove is limited to 30–50% of the wire of the resister ring 7 in diameter) and a jig such as a metal core rod is inserted in the hollow portion 31 during rolling, it becomes possible to conduct groove forming with high precision, preventing the deformation of the rolled area.

The plunger material of which groove forming has been completed by rolling is subject to the centerless grinding after heat treatments such as carburizing-hardening. The outer peripheral surface of the hollow portion 31 of the plunger 3 and cylindrical face 34 are finished by this centerless grinding. The centerless grinding is employed to finish the matching face between the plunger and the inner periphery 1a of the housing with a predetermined precision. The finishing condition of this matching face determines the leakage of operating oil and sliding resistance of the plunger 3. If the centerless grinding is employed, the machining cost can be minimized or much lower than the usual level in comparison with the normal grinding process.

The follows are the materials suitable for use in the components of the chain tensioner of the present invention.

① Housing

Usually, the housing 1 is made by forging. The materials for the housing can be cast iron such as FC250 and light alloys such as aluminum alloys.

② Plunger

The steel-based materials for the plunger 3 can be carbon steel for machine construction, chromium steel, chromium molybdenum steel and manganese steel for machine construction. Among them, steel of which carbon content is 0.25% or less is preferable in terms of workability, quenching performance during heat treatment and cost.

Specifically, they are:
Carbon steel for machine construction,
    S10C (carbon content 0.08–0.13%)
    S12C (carbon content 0.10–0.15%)
    S15C (carbon content 0.13–0.18%)
    S17C (carbon content 0.15–0.20%)
    S20C (carbon content 0.18–0.23%)
Chromium steel,
    SCr415 (carbon content 0.13%–0.18%)
    SCr420 (carbon content 0.18%–0.23%)
Chromium molybdenum steel,
    SCM415 (carbon content 0.13%–0.18%)
    SCM418 (carbon content 0.16%–0.21%)
    SCM420 (carbon content 0.18%–0.23%)
    SCM421 (carbon content 0.17%–0.23%)
Manganese steel for machine construction,
    SMn420 (carbon content 0.17–0.23%).

In the above materials, SCr420 and SCM415, which show excellent forging workability, are most preferable.

③ Check Valve

The steel materials suitable for the plunger 3 can also be used for the check valve components (valve seat 61, valve 63, retainer 64).

④ Resister Ring

Preferably, the resister ring 7 is made of piano wires such as SWP-A, SWP-B and SWP-V, considering its required workability and cost. When the resister ring is used at high temperatures (120° C. or higher), silicon-chromium steel wires for use in valve-springs such as SWOSC-V may be used.

The above embodiment has shown the tapered face 332, as an example, on which the resister ring 7 slides, as the sliding face on the outer periphery of the plunger 3. The above embodiment has also showed the example in which such a sliding face is formed in the area including the latching grooves 33a–33d. However, the sliding face may be formed separate from the latching grooves 33a–33d. For example, in FIG. 2, it may be allowed in the present invention that the tapered face 332 is shortened or omitted to shorten the axial length of the latching grooves 33a–33d while the length of the cylindrical face 34 is elongated along the axial direction to use this cylindrical face 34 as the sliding face for the resister ring 7.

As described so far, the present invention provides a chain tensioner that is compact, easy to maintain and handle, and inexpensive.

According to the present invention, latching grooves of precise roughness can be provided at low cost. Thus the plunger can move back and forth smoothly and the chain tensioner works with high stability.

Also according to the present invention, the plunger moves smoothly back and forth, guided by the tapered face, and the chain tensioner having the improved response and operational stability is provided. When the taper angle of the tapered face is set between 8–20 degrees, degradation of working accuracy and significant increase in the backward stroke due to an insufficient taper angle can be prevented, and poor movement of the plunger due to an excessive taper angle can be prevented. As a result, operational stability of the chain tensioner is improved, and noise generation from a loose chain is prevented. Since the latching grooves are formed on the outer periphery of the plunger, the latching grooves can be finished by rolling, for example. As a result, compared with the case employing grinding, the chain tensioner can be manufactured at low cost with high precision.

Moreover in this invention, since the surface roughness, Rmax, of the sliding face on the plunger on which the resister ring slides, is limited to the range, Rmax≦6.3 μm (preferably, Rmax≦3.2 μm), the plunger moves back and forth smoothly and thus the resister ring can be protected from damage caused by abrasion for a long period of time. As a result, the provided chain tensioner presents an excellent response, high operational stability and reliability, and a long life. Since its latching grooves are formed on the outer periphery of the plunger, it becomes possible to form these latching grooves by rolling, for example, thus provide surface roughness of the aforementioned levels that are hard to attain by grinding at low cost.

The invention claimed is:

1. A chain tensioner comprising:
a tubular housing having a bottom;
a plunger installed in the housing so as to smoothly slide therein and having a hollow portion;
a return spring inserted in the hollow portion of the plunger and providing the plunger with a force pushing outward;
a plurality of latching grooves formed on an outer periphery of the plunger including an outer periphery of the hollow portion;
a resister ring capable of locking in the latching grooves and sliding on the latching grooves back and forth along with the reciprocating movement of the plunger, the resister ring having a ring portion and a manipulation portion for radially expanding the ring portion, the manipulation portion being manipulable from outside of the tubular housing through a notch cut in the housing;
a first stopper formed on an inner periphery of the housing and limiting backward movement of the plunger by mating the resister ring locked in the latching groove therewith;
a second stopper capable of mating with the resister ring installed in front of the first stopper on the inner periphery of the housing; and
an annular guide groove formed in the vicinity of an opening end of the inner periphery of the housing for setting the resister ring, and having the first and second stoppers on axially opposing walls at either end thereof.

2. The chain tensioner according to claim 1, wherein said second stopper is formed in a piece together with the housing.

3. The chain tensioner according to claim 1, wherein an inner diameter of said second stopper of the housing is smaller than an outer diameter of the resister ring.

4. The chain tensioner according to claim 1, wherein a set wall capable of mating with the second stopper via the resister ring is formed in front of the foremost latching groove on the outer periphery of the plunger.

5. The chain tensioner according to claim 1, wherein a safety wall capable of mating with the second stopper via the resister ring is formed behind the rearmost latching groove on the outer periphery of the plunger.

6. The chain tensioner according to claim 1, wherein said plunger has an air vent leading to the hollow portion.

7. The chain tensioner according to claim 1, wherein each latching groove is provided with a tapered face at its rear.

8. The chain tensioner according to claim 7, wherein a cylindrical face is formed behind the tapered face of each latching groove.

9. The chain tensioner according to claim 1, wherein a check valve for supplying a working fluid in a space between the housing bottom and the plunger and preventing its reverse flow is installed therein.

10. A chain tensioner comprising a tubular housing having a bottom, a plunger installed in an inner periphery of the housing so as to smoothly slide therein, a return spring providing the plunger with a force pushing outward, a resister ring installed between the inner periphery of the housing and an outer periphery of the plunger, and a latching groove and a first stopper each capable of mating with the resister ring; and limiting backward movement of the plunger by mating the latching groove with the first stopper via the resister ring;
wherein the latching groove, provided with a tapered face on which the resister ring slides back and forth along with the reciprocating movement of the plunger at its rear, is formed on the outer periphery of the plunger and a taper angle of the tapered face against the plunger axial line is at least 8 degrees and no more than 20 degrees, and
wherein the resister ring is manipulable so as to expand its diameter from outside of the tubular housing through a notch cut in the housing.

11. A chain tensioner comprising a tubular housing having a bottom, a plunger installed in an inner periphery of the housing so as to smoothly slide therein, a return spring providing the plunger with a force pushing outward, a resister ring installed between the inner periphery of the housing and an outer periphery of the plunger, and a latching groove and a first stopper each capable of mating with the resister ring; and limiting backward movement of the plunger by mating the latching groove with the first stopper via the resister ring;
wherein the latching groove provided with a tapered face on which the resister ring slides back and forth along with the reciprocating movement of the plunger at its rear is formed on the outer periphery of the plunger and the surface roughness, Rmax, of a sliding face of the plunger outer periphery on which the resister ring slides is no more than 6.3 μm, and
wherein the resister ring is manipulable so as to expand its diameter from outside of the tubular housing through a notch cut in the housing.

12. The chain tensioner according to claim 11, wherein said surface roughness, Rmax, of the sliding face is no more than 3.2 μm.

13. The chain tensioner according to any one of claims 10–9, wherein said resister ring has a ring portion and a manipulation portion for radially expanding the ring.

14. The chain tensioner according to claim 13, wherein said manipulation portion can be manipulated from outside of the housing through the notch cut in the housing.

15. The chain tensioner according to claim 14, wherein said notch is formed so that the resister ring is not in contact with a bottom of the notch when the resister ring locked in the latching groove is mated with the first stopper.

16. The chain tensioner according to claim 13, wherein said resister ring has a crossover.

* * * * *